United States Patent
Karaoguz et al.

(10) Patent No.: US 9,130,998 B2
(45) Date of Patent: Sep. 8, 2015

(54) UTILIZING AN ELECTRONIC PROGRAM GUIDE (EPG) FOR CUSTOMIZED CONTENT SERVICE IN A GATEWAY

(75) Inventors: Jeyhan Karaoguz, Irvine, CA (US); Xuemin Chen, Rancho Santa Fe, CA (US); Wael William Diab, San Francisco, CA (US); David Garrett, Tustin, CA (US); David Albert Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 428 days.

(21) Appl. No.: 12/982,000

(22) Filed: Dec. 30, 2010

(65) Prior Publication Data

US 2011/0302610 A1     Dec. 8, 2011

Related U.S. Application Data

(60) Provisional application No. 61/351,696, filed on Jun. 4, 2010.

(51) Int. Cl.
  *H04L 29/06* (2006.01)
  *H04N 5/445* (2011.01)
  (Continued)

(52) U.S. Cl.
  CPC .............. *H04L 63/205* (2013.01); *G05B 13/02* (2013.01); *G05F 1/66* (2013.01); *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.01); *H04L 47/2491* (2013.01); *H04L 63/0281* (2013.01); *H04L 63/10* (2013.01); *H04L 65/102* (2013.01);
  (Continued)

(58) Field of Classification Search
  CPC ... G06Q 20/10; G06Q 30/0226; G06Q 30/04; G06Q 40/12; H04L 47/2491; H04L 65/40; H04L 65/102; H04L 67/10; H04L 63/0281; G05B 13/02; G05F 1/66; G06F 21/10; H04N 5/445; H04N 21/482
  USPC ........................................................ 725/39–54
  See application file for complete search history.

(56) References Cited

U.S. PATENT DOCUMENTS

2003/0005446 A1 *   1/2003   Jaff et al. ...................... 725/51
2003/0120758 A1 *   6/2003   Yassin et al. ................. 709/221
(Continued)

*Primary Examiner* — Randy Flynn
(74) *Attorney, Agent, or Firm* — Foley & Lardner LLP; Christopher J. McKenna; Paul M. H. Pua

(57) ABSTRACT

A broadband gateway, which that enables communication with a plurality of devices, handles at least one physical layer connection to at least one corresponding network access service provider. The broadband gateway may identify EPG information from service providers. The identified EPG information may be adapted to device attributes such as display resolution, and/or user profiles to generate user-specific EPG information for the corresponding devices. The generated user-specific EPG information may be dynamically configured in response to updates in the identified EPG information, the device attributes and/or the user profiles. The configured user-specific EPG information may be communicated to the corresponding devices, either upon the requests from the devices or by initiation of the broadband gateway, for content selection and/or content scheduling. Advertising content, selected based on analysis of the user behavior and/or the user feedbacks, may be communicated in the user-specific EPG information to the devices to support behavioral marketing.

22 Claims, 5 Drawing Sheets

(51) Int. Cl.

| | | |
|---|---|---|
| *H04N 21/482* | (2011.01) | |
| *G06Q 20/10* | (2012.01) | |
| *G06Q 30/02* | (2012.01) | |
| *G06Q 30/04* | (2012.01) | |
| *H04L 12/857* | (2013.01) | |
| *G06Q 40/00* | (2012.01) | |
| *H04L 29/08* | (2006.01) | |
| *G06F 21/10* | (2013.01) | |
| *G05B 13/02* | (2006.01) | |
| *G05F 1/66* | (2006.01) | |
| *H04L 12/24* | (2006.01) | |

(52) U.S. Cl.
CPC ............... *H04L 65/40* (2013.01); *H04L 67/10* (2013.01); *H04L 67/1095* (2013.01); *H04N 5/445* (2013.01); *H04N 21/482* (2013.01); *G06F 2221/07* (2013.01); *H04L 41/32* (2013.01); *H04L 41/5019* (2013.01)

(56) References Cited

U.S. PATENT DOCUMENTS

| | | | |
|---|---|---|---|
| 2004/0002987 A1* | 1/2004 | Clancy et al. | 707/101 |
| 2005/0022237 A1* | 1/2005 | Nomura | 725/50 |
| 2005/0210508 A1* | 9/2005 | Lau et al. | 725/46 |
| 2007/0208718 A1* | 9/2007 | Javid et al. | 707/3 |
| 2007/0266403 A1* | 11/2007 | Ou et al. | 725/46 |
| 2008/0022335 A1* | 1/2008 | Yousef | 725/100 |
| 2009/0100147 A1* | 4/2009 | Igarashi | 709/218 |
| 2009/0190603 A1* | 7/2009 | Damola et al. | 370/401 |
| 2009/0292799 A1* | 11/2009 | Eisener et al. | 709/223 |
| 2011/0107379 A1* | 5/2011 | Lajoie et al. | 725/87 |
| 2011/0258665 A1* | 10/2011 | Fahrny et al. | 725/47 |

* cited by examiner

UTILIZING AN ELECTRONIC PROGRAM GUIDE (EPG) FOR CUSTOMIZED CONTENT SERVICE IN A GATEWAY

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety

INCORPORATION BY REFERENCE

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981/971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 21/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010; and
U.S. patent application Ser. No. 12/981,753 filed on Dec. 30, 2010.

FIELD OF THE INVENTION

Certain embodiments of the invention relate to broadband gateways. More specifically, certain embodiments of the invention relate to a method and system for utilizing an electronic program guide (EPG) for customized content service in a gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for utilizing an electronic program guide (EPG) for customized content service in a gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for utilizing an electronic program guide (EPG) for customized content service in a gateway. In various embodiments of the invention, a broadband gateway, which enables communication with a plurality of devices, is operable to handle at least one physical layer connection to at least one corresponding network access service provider. In this regard, the at least one physical layer connection may comprise a plurality of physical layer connections and the at least one corresponding network access service provider may comprise a plurality of access service providers. Each of the plurality of physical layer connections corresponds to a respective one of the plurality of corresponding access service providers. The broadband gateway may identify EPG information from the service providers. The identified EPG information may be adapted to device attributes and/or user profiles to generate user-specific EPG information. Device attributes may comprise a display resolution, decoding algorithms, power consumption levels, and/or bandwidth. User profiles may comprise user criteria, user preferences, user behavior, and/or user feedbacks. The generated user-specific EPG information may be dynamically configured in response to updates in the identified EPG information, the device attributes and/or the user profiles. The configured user-specific EPG information may be communicated to the corresponding devices, either upon the requests from the devices or by initiation of the broadband gateway. The user-specific EPG information may be displayed on the corresponding devices for content selection and/or content scheduling. Advertising content, selected based on the analysis of the user behavior and/or the user feedbacks, may be communicated in the user-specific EPG information to the devices to support behavioral marketing.

Figure 1:
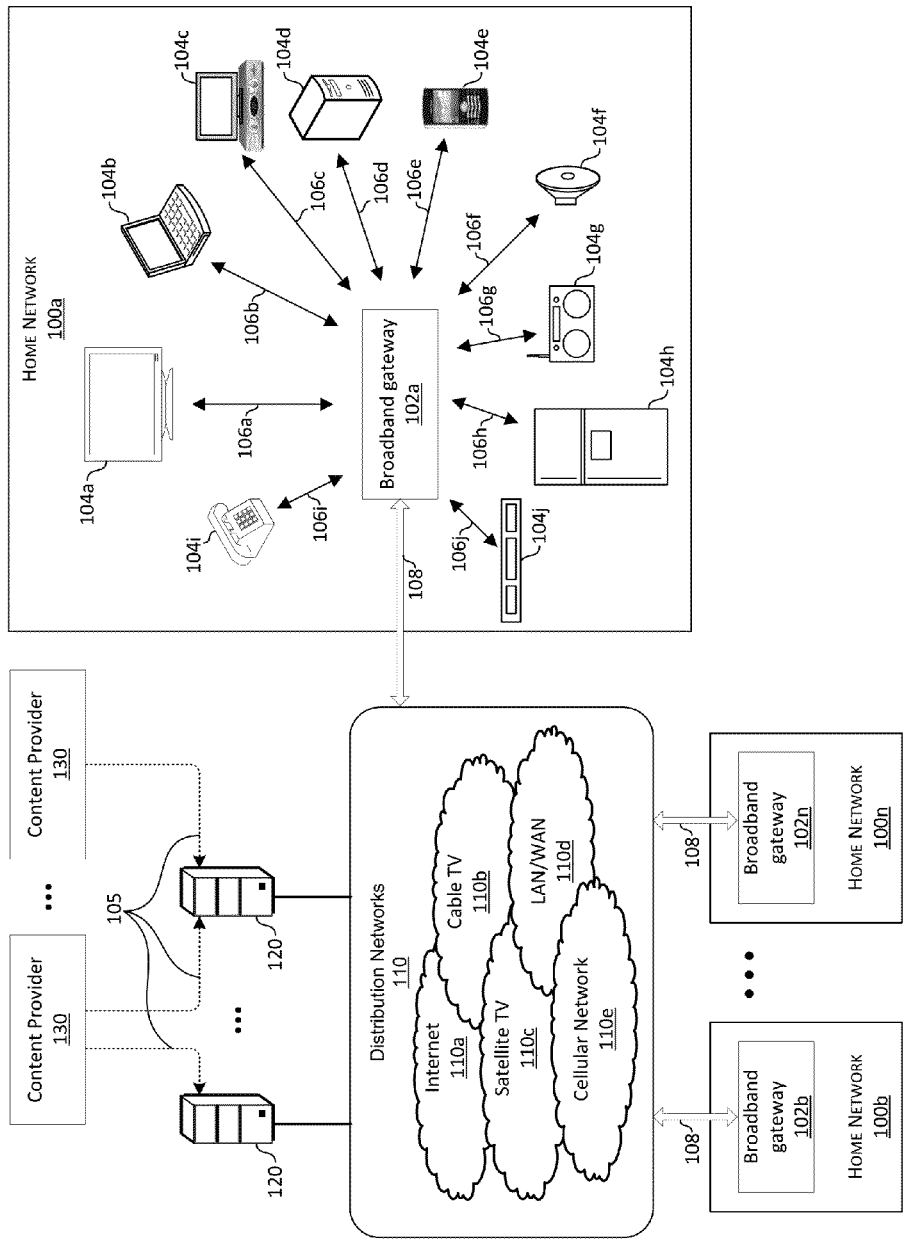
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102a. Also shown in FIG. 1 are additional home networks 100b, . . . , 100n. Each of the home networks 100b, . . . , 100n may also be serviced by a broadband gateway 102b, . . . , a broadband gateway 102n.

The service providers 120 may comprise various entities which may provide various services using different access technologies to devices 104 via the gateway 102a and/or to the gateway 102a itself. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the gateway 102a. Such physical layer connections may then be utilized to access, and/or may be part of, the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, as indicated by the dashed lines 105, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 110 via a physical layer connection provided by a network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102a. In this regard, the location may be a residence (e.g., home, apartment), a small business, a school, a library, and/or other like settings in which users may want to obtain access to service and/or to content provider networks. The broadband gateway 102a may be utilized in the home network 100a to provide connectivity between the home network 100a and the service providers 120 (and/or the content providers 130) via the distribution networks 110.

A broadband gateway such as the broadband gateway 102a may comprise suitable logic, circuitry, interfaces, and/or code that may be operable to provide connectivity between one or more devices in a home network, such as the home network 100a, and a plurality of external networks. For example, the broadband gateway 102a may handle a plurality of broadband physical layer connections 108 to the distribution networks 110. The broadband physical layer connections 108 may comprise wired, optical, and/or wireless connections between the broadband gateway 102 and the distribution networks 110, which may enable communication between the broadband gateway 102a and the service providers 120. The broadband gateway 102a may operate as an interface device that may allow one or more service and/or content providers to interact with various devices in the home network. In this regard, the broadband gateway 102a may be operable to perform and/or provide various services that may pertain to enabling and/or facilitating reception of content from one or more content providers, wherein the content may be delivered through one or more services providers. For example, the broadband gateway 102a may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102a may communicate with various devices in the home network 100, using wired and/or wireless communication links.

A single broadband gateway such as the broadband gateway 102a may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the broadband gateway 102a via a DSL connection over twisted-pair cabling, and a second network access service provider 120 may provide network access to the broadband gateway 102a via a cable television connection over coaxial cabling. In some instances, the broadband gateway 102a may be operable to concurrently communicate over multiple physical layer connections provided by multiple network access service providers.

The broadband gateway 102a may also be operable to provide and/or support various other, non-content related services in the home network 100a. For example, the broadband gateway 102a may be operable to provide energy management in the home network 100a, by controlling and/or adjusting configuration of one or more devices in the home network to reduce power consumption for example.

Devices serviced by, and/or connected with the broadband gateway 100a may comprise content consuming devices and/or other, non-content consuming household or home devices that may be operable to interact with the broadband gateway 102a. For example, the broadband gateway 102a may service, and/or may communicate with a plurality of home devices 104a-104j in the home network 100a. The home devices may comprise, for example, one or more of a television 104a, a laptop computer 104b, a smoke detector, a carbon monoxide detector, and/or a security alarm 104j, a computer and/or server 104d, a mobile phone 104e, a speaker 104f, an AM/FM radio 104g, a phone 104i, an appliance 104h (e.g., refrigerator), and a digital video recorder (DVR) or personal video recorder (PVR) 104c. The broadband gateway 102a may interact with each of the home devices 104a-104j via links 106a-106j, which may be supported by the broadband gateway 102a and the corresponding home device. U.S. patent application Ser. No. 12/982,172 filed on Dec. 30, 2010 and U.S. patent application Ser. No. 12/982,429 filed on Dec. 30, 2010 provide detailed description of a broadband gateway 102a may be operable to customize acquisition and delivery of content to the plurality of home devices 104a-104j via the links 106a-106j, and are hereby incorporated herein by reference in their entireties. In this regard, the broadband gateway 102a may be operable to build user interfaces such as electronic programming guide (EPG), webpage and/or html-based user interfaces so as to display (e.g. on the screen) programming quality, price, and/or service provider type on the plurality of home devices 104a-104j for users to select or schedule desired content.

The link 106a between the broadband gateway 102a and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102a. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j, may communicate only the broadband gateway 102a as shown, the invention may not be so limited. Accordingly, the devices 104a-104j, may communicate with multiple broadband gateways in a local or home network without departing from the spirit and scope of various embodiments of the invention.

As illustrated in FIG. 1, a plurality of home networks 100b, ..., 100n, may also be connected to the distribution networks 110. These home networks 100b, ..., 100n may operate in substantially the same manner as the home network 100a. By having multiple home networks connected to the distribution networks 110, various applications, such as peer-to-peer communication and/or data aggregation operations may be possible by utilizing the broadband gateways 102a, ..., 102n in the home networks.

In operation, for particular content that is to be delivered from a provider 120 and/or 130 to a device 104, the gateway 102a may be operable to utilize various options to customize content so as to fit with the device attributes/capabilities and/or user preferences for the device 104. The device attributes may comprise a display resolution, decoding algorithms or techniques supported, power consumption levels, quality of service (QoS), number of programs or channels supported, and/or a bandwidth required for a connection between the device 104 and the broadband gateway 102a. For example, in instances where the device 104 consumes content via a high-definition display, the gateway 102a may customize content for the device 104 by matching the resolution of the device 104.

In an embodiment of the invention, the broadband gateway 102a may generate user-specific EPG information for the device 104 by converting EPG information provided by multiple service providers. In this regard, the broadband gateway 102a may monitor network status such as, for example, whether a service provider is newly available online, and accordingly identify and/or update EPG information from one or more new and/or existing service providers. The identified EPG information may comprise, for example, service provider, service provider type, program or content, programming quality, bandwidth, resolution, power consumption level, payment/price, and/or time availabilities. The broadband gateway 102a may track device attributes and/or user preferences for the device 104. The broadband gateway 102a may convert the identified EPG information, from the one or more service providers, to fit the device attributes and/or user preferences for the device 104 for user-specific EPG information. In this regard, the user-specific EPG information for the device 104 may be dynamically configurable in response to updates in the identified EPG information, from the service providers, the device attributes and/or the user preferences for the device 104. The device 104 may display the user-specific EPG information for the user of the device 104 to select or schedule future desired content.

In an embodiment of the invention, the broadband gateway 102a may create and provide user-specific EPG information to associated devices such as the device 104, either upon a request from the device 104 or by initiation of the broadband gateway 102a. The user-specific EPG information may be provided by the broadband gateway 102a to the device 104 periodically or on an as-needed basis.

In an embodiment of the invention, the broadband gateway 102a may analyze user behavior and/or user feedback on the device 104 to identify content's relevance to the device 104. For example, user feedback such as content rating and/or user behavior such as selecting or skipping content may indicate user's dislike or like of particular content. User-specific EPG information may be generated for the device 104 based on the analysis of the user behavior and the user feedback on the device 104.

In an embodiment of the invention, the broadband gateway 102a may support behavioral marketing for customized content service in the home network 100a. Behavioral marketing is technique to incorporate the behavior of individuals in consumer-relevant domains. In this regard, the broadband gateway 102a may select or identify content for advertisement based on the analysis of the user behavior and the user feedback on the device 104, for example. The broadband gateway 102a may convey or otherwise communicate the selected advertising content in user-specific EPG information to the device 104.

Figure 2:
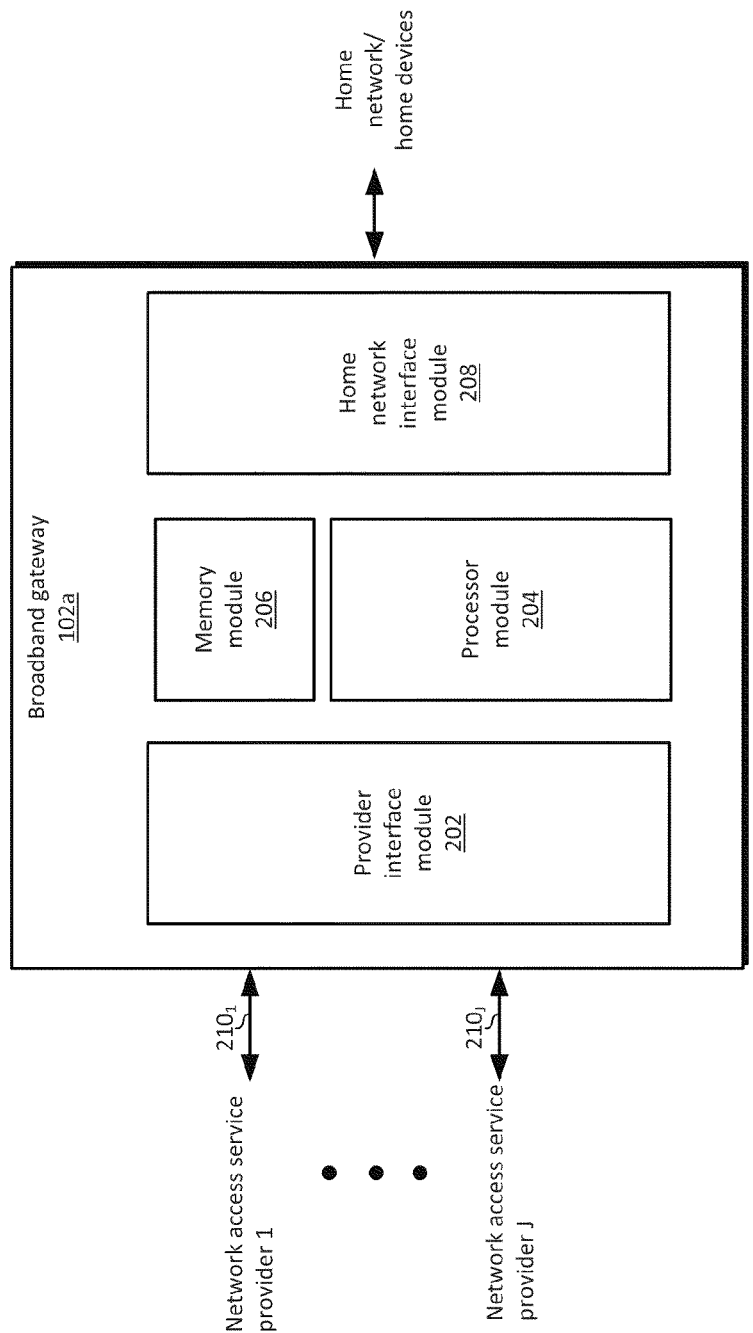
FIG. 2 is a diagram illustrating an exemplary broadband gateway operable to dynamically configure user-specific EPG information for customized content service in a home network, in accordance with an embodiment of the invention.

FIG. 2 is a diagram illustrating an exemplary broadband gateway operable to dynamically configure user-specific EPG information for customized content service in a home network, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1.

A gateway such as the broadband gateway 102a may operate as an interface device that allows one or more devices in the home network to access one or more networks, and to access various services and/or content via those one or more networks. For example, the broadband gateway 102a may be utilized to enable interaction between the plurality of service providers 120 and/or the plurality of content providers 130, and the home devices 104a-104j.

The broadband gateway 102a may communicate with the various devices via a home network that may comprise wired and/or wireless communication links, such as the home network 100a. In this regard, the broadband gateway 102a may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102a may communicate with the various devices in the home via more than one home network.

The broadband gateway 102a may be operable to provide energy management by varying the configuration of one or more devices in the home network. The broadband gateway 102a may collect and/or store energy-related information of the devices in the home network and/or of the links in the home network, and may utilize such information to control the operation of the home devices. For example, the broadband gateway 102a may utilize channel capacity flexibility and content coding options to minimize and/or optimize power utilization. The broadband gateway 102a may also configure and/or manage the configuration of the network between the broadband gateway 102a and one or more service/content providers based on the energy-related information associated with the devices in the home. For example, at least a portion of the distribution networks 100 may be configured and/or managed in this manner. The broadband gateway 102a may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 102a may be utilized to provide that information to a service/content provider and obtain rewards/credits associated with the use of such certified devices. Moreover, overall network power consumption may be managed by sharing information among multiple interconnected broadband gateways.

The broadband gateway 102a may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102a may be utilized to reduce bandwidth and/or processing power consumption in the home network. The broadband gateway 200 may also support and/or use multi-transport processing, which may be performed sequentially, in parallel, and/or utilizing distributed processing.

The broadband gateway 102a may be operable to broker and/or arbitrate with service/content providers the consumption of certain services, such as music and video, for example.

In some instances, the broadband gateway 102a may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102a, including allowing first responders to provide alerts to a select group of users by accessing the broadband gateway 102a via secure links provided by the service/content providers. For example, the broadband gateway 102a may enable an emergency service provider, such as those associated with the emergency service provider network 140 described above in FIG. 1, to access one or more devices in the home network.

Customized graphical user interfaces (GUIs) may be generated by the broadband gateway 102a, wherein the GUIs such as user-specific EPG interface may be used to visually display and/or provide interaction with the customized content. In this regard, the broadband gateway 102a may communicate with the plurality of service providers 120 and/or the plurality of content providers 130 for EPG information such as available service providers, service provider type, possible program or content, programming quality, bandwidth, power consumption level, payment/price, and/or time availabilities. The broadband gateway 102a may communicate with the home devices 104a-104j to track or monitor corresponding device attributes and/or user preferences.

The EPG information, provided by the plurality of service providers 120 and/or the plurality of content providers 130, may be adapted or reconstructed to fit the device attributes and/or user preferences for the corresponding home devices 104a-104j. For example, in some instances, the EPG information identified from the service providers are for a high definition TV and may be consumed in, for example, an iPad and/or a mobile phone or other handheld communication devices. In this regard, the broadband gateway 102a may convert the identified EPG information to fit the device attributes such as resolution and/or preferred power consumption levels associated with the iPad and/or the mobile phone or other handheld communication devices, respectively. In other words, the broadband gateway 102a may generate and provide user-specific EPG information to the corresponding home devices 104a-104j. Depending on system configuration, the user-specific EPG information may be provided or communicated to the home devices 104a-104j upon requests from the home devices 104a-104j or by initiation of the broadband gateway 102a.

In some instances, the broadband gateway 102a may monitor or analyze user behavior and/or user feedback on the home devices 104a-104j. User-specific EPG information may be generated and provided to the home devices 104a-104j based on the analysis of the user behavior and/or user feedback on the home devices 104a-104j. In addition, the broadband gateway 102a may identify or select advertising content relevant to the user behavior and/or user feedback on the corresponding home devices 104a-104j. The broadband gateway 102a may communicate the corresponding identified advertising content in user-specific EPG information to the home devices 104a-104j to support behavioral marketing in the home network 100a.

For peer-to-peer communication, the broadband gateway 102a may be utilized to allow enhanced content sharing in a service/content provider network. In this regard, the broadband gateway 102a may be utilized to construct a directory service for peer-to-peer connectivity with friends and family, for example. The broadband gateway 102a may be utilized to provide incentives to users who engage in peer-to-peer communication through, for example, the distribution networks 110. Moreover, the broadband gateway 102a may be utilized to match the content coding to the service type being consumed by the user and to make the necessary allocations through the network with respect to peer-to-peer or conventional Internet programming or broadcast programming.

The broadband gateway 102a may be utilized in connection with constrained network resources, such as time of day, traffic congestion, and the like, for example, to provide incentives for a user to accept a lower cost, lower quality of service that is dynamically configured for current network conditions. In some instances, the broadband gateway 102a may allow enhanced low latency service delivery to client devices in a home network.

The broadband gateway 102a may be operable to run or execute an agent to extract content, rating, copyright, language, privacy rules, and automatically add user generated content, for example. Such agent may be run or executed in connection with the processor module 204 of the broadband gateway 102a, for example. In some instances, the broadband gateway 102a may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102a.

The broadband gateway 102a may be operable to combine and/or blend multiple contents for use as single content in the home network. Such combination may be performed in one or more of the modules of the broadband gateway 102a. For example, the broadband gateway 102a may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102a. Only when a user authorizes the transfer of the confidential data will such data be stored and/or aggregated. The broadband gateway 102a may be operable to create a trusted rating mechanism for content. The broadband gateway 102a may be secure against external threats that may be downloaded from outside the home network and may provide a secure domain distribution in the home network. Automated and secured billing and payment services may also be provided by the broadband gateway 102a.

The broadband gateway 102a may be operable to utilize client or home device profile information to select layered video service(s) and/or transmission. Such information may be stored, at least temporarily, in the memory module 206 of the broadband gateway 102a. In some instances, the programming and/or enhanced video layers received by the broadband gateway 102a may be aggregated midstream by one or more network or routing nodes.

The broadband gateway 102a may support a reduction in the cost of unwatched content by using multi-tier billing for downloaded content, such as video content. The broadband gateway 102a may be utilized to provide a unified payment portal for collecting and/or aggregating charges from multiple service and/or content providers.

The broadband gateway 102a may comprise one or more modules. Each of these modules may comprise hardware, software, or a combination thereof that may be utilized to perform various operations associated with the broadband gateway 102a. In an embodiment of the invention, the broadband gateway 102a may comprise a provider interface module 202, a processor module 204, a memory module 206, and a home network interface module 208. In some instances, the broadband gateway 102a may be such that the various modules listed above may be distributed over multiple devices. Moreover, the modules listed above are provided by way of illustration and not of limitation. Other configurations and/or architectures of the broadband gateway 102a may also be implemented. For example, the broadband gateway 102a may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 210 to one or more network access service providers. In this regard, each of the physical layer connections $210_1$-$210_J$ may connect the gateway 110 to a difference network access service provider. Each of the physical layer connections 210 may comprise a wired, optical, or wireless connection. Each of the physical layer connections 210 may utilize different physical media and/or different physical layer protocols. For example, the connection $210_1$ may comprise a DSL over twisted-pair connection and the connection $210_J$ may comprise a CATV over coaxial cable connection.

The processor module 204 may comprise suitable logic, circuitry, code, and/or interfaces that may be operable to process data received from the service/content providers and/or data received from one or more devices 104 in the home. Data received from the service/content providers via one or more physical layer connections $210_1$-$210_J$ may be processed to make it suitable for communication to a device such as the device 104a and data from the one or more devices 104 may be processed to make it suitable for communication to the service/content providers via one or more physical layer connections $210_1$-$210_J$. In this regard, the processor module 204 may comprise one or more portions that are suitable to handle communication or interactions between the plurality of service providers 120 and/or the plurality of content providers 130 and the devices 104.

The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the broadband gateway 102a. The GUI may be a web-based interface or an EPG-based interface, and a user may interact with it via a computer and web browser. The GUI may be customized based on characteristics of the broadband gateway 102a, the device 104 coupled to the broadband gateway 102a, and the service and/or content providers associated with the broadband gateway 102a. The processors module 204 may utilize the memory 206 in performing its functions. For example, the processor module 204 may communicate, via the provider interface module 202, with associated networks and/or service providers such as the plurality of service providers 120 to identify EPG information.

The processor module 204 may reconstruct the identified EPG information according to device attributes and/or user preferences for the corresponding devices 104. The processor module 204 may utilize the reconstructed EPG information to generate user-specific EPG information for the corresponding devices 104. The generated user-specific EPG may be provided or communicated, via the home network interface module 208, to the corresponding devices 104, either upon requests from the devices 104 or by initiation of the broadband gateway 102a. In addition, the processor module 204 may monitor and analyze user behavior and/or user feedback on the corresponding devices 104 for the user-specific EPG information. Furthermore, advertising content relevant to the user behavior and the user feedback may be selected or discovered. The selected advertising content may be communicated in the user-specific EPG information to the devices 104 to support behavioral marketing.

The memory module 206 may comprise suitable logic, circuitry, code, and/or interfaces that may be operable to store data utilized in the operations of the broadband gateway 102a. For example, the memory module 206 may be utilized to store configuration data, parameters, device information, tracking and/or monitoring information, security information, and intermediate processing data, for example. The memory module 206 may comprise storage media that may be integrated in the broadband gateway 102a and/or may be removable such as a removable storage device.

The home network interface module 208 may comprise suitable logic, circuitry, code, and/or interfaces that may be operable to receive data from and/or send data to one or more devices in the home network. The home network interface module 208 may be operable to support multiple communication protocols, standards, and/or data transport technologies. In this regard, the home network interface module 208 may handle one or more physical layer connections to one or more devices 104. For example, the home network interface module 208 may comprise, one or more wired and/or wireless Ethernet interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

In operation, the broadband gateway 102a may generate a graphical user interface (GUI) such as a user-specific EPG based on characteristics of the devices 104 coupled to the broadband gateway 102a and the service and/or content providers associated with the broadband gateway 102a. The processors module 204 may discover or identify, via the provider interface module 202, EPG information one or more service providers. The EPG information may be adapted to device attributes and/or user preferences for the corresponding devices 104 and utilized to generate user-specific EPG information. The processor module 204 may provide or communicate, either upon requests from the devices 104 or by initiation of the broadband gateway 102a, the generated user-specific EPG information to the corresponding devices 104 via the home network interface module 208. User behavior and/or user feedback on the devices 104 may be monitored and analyzed to generate user-specific EPG information for the corresponding devices 104. Advertising content relevant to the user behavior and the user feedback may be selected and may be conveyed to the devices 104 in the user-specific EPG information for behavioral marketing.

Figure 3:
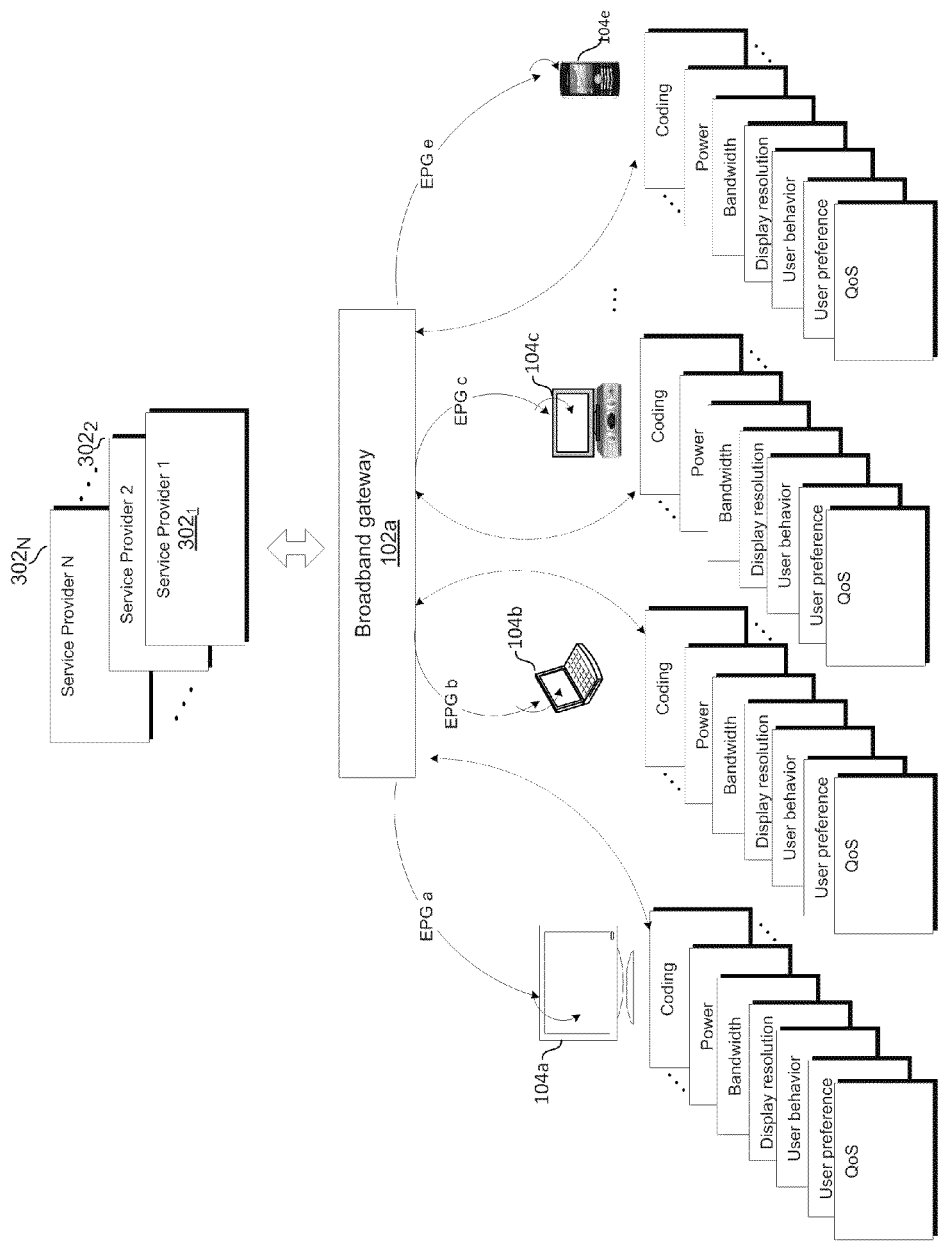
FIG. 3 is a diagram illustrating an exemplary procedure in which a broadband gateway is operable to utilize EPG information provided by multiple service providers to generate and provide user-specific EPG information for customized content service in a home network, in accordance with an embodiment of the invention.

FIG. 3 is a diagram illustrating an exemplary procedure in which a broadband gateway is operable to utilize EPG information provided by multiple service providers to generate and provide user-specific EPG information for customized content service in a home network, in accordance with an embodiment of the invention. Referring to FIG. 3, there is shown a procedure in which a broadband gateway 102a generates and provides the user-specific EPG information according to device attributes and user device preferences. The broadband gateway 102a may identify or determine device attributes, user preferences and/or user behavior information for the corresponding devices 104a-104e. The broadband gateway 102a may dynamically reconstruct the EPG information, provided by multiple service providers $302_1$-$302_N$, where the parameter N is a positive integer number, based on the corresponding device attributes, user preferences and/or user behavior information on the devices 104a-104e. The resulting user-specific EPG information may be provided or communicated to the devices 104a-104e, respectively. The devices 104a-104e may display the corresponding user-specific EPG information for content selection and/or content scheduling.

Figure 4:
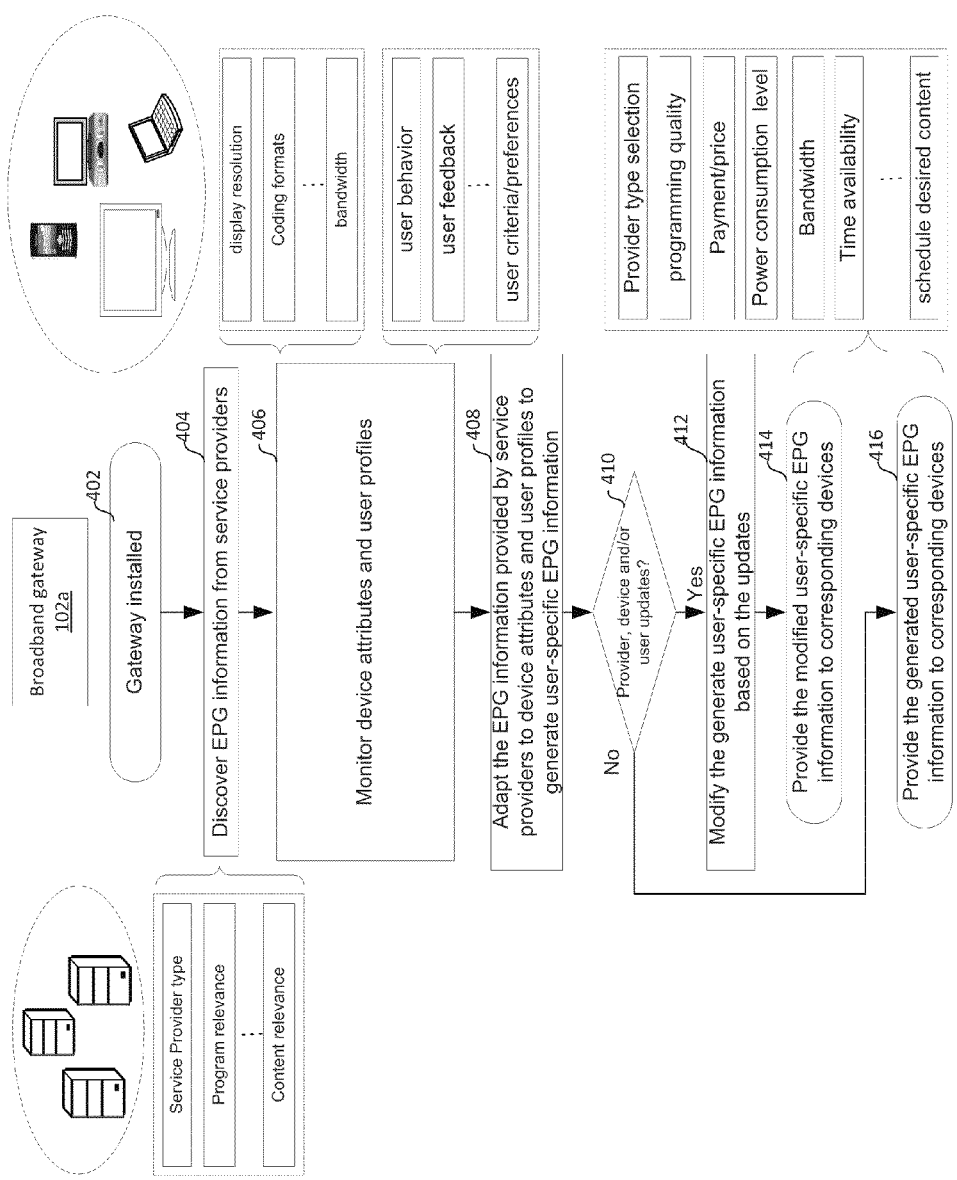
FIG. 4 is a flow chart illustrating exemplary steps that may be performed by a broadband gateway to dynamically generate and provide user-specific EPG information for customized content service in a home network, in accordance with an embodiment of the invention.

FIG. 4 is a flow chart illustrating exemplary steps that may be performed by a broadband gateway to dynamically generate and provide user-specific EPG information for customized content service in a home network, in accordance with an embodiment of the invention. Referring to FIG. 4, the exemplary steps may begin with step 402, in which a broadband gateway 102a may interface with service providers $302_1$-$302_N$ and devices 104 coupled to the broadband gateway 102a. In step 404, the broadband gateway 102a may monitor network status to identify or discover EPG information provided by the multiple service providers $302_1$-$302_N$. In step 406, the broadband gateway 102a may monitor or track device attributes and/or user profiles for the devices 104. The user profiles may comprise information on user criteria/preferences, user behavior information and/or user feedbacks.

In step 408, the broadband gateway 102a may adapt the EPG information provided by the service providers $302_1$-$302_N$ to the device attributes and user profiles to generate user-specific EPG information for the corresponding devices 104. In step 410, it may be determined whether there are updates for service providers, devices and/or users. In instances where there are updates for service providers, devices and/or users, then in step 412, the broadband gateway 102a may modify or configure the generated user-specific EPG information based on the updates. In step 414, the broadband gateway 102a may provide or communicate the modified or configured user-specific EPG information to corresponding devices 104.

In step 410, in instances where there are no updates for the service providers, devices and/or users, then in step 416, the broadband gateway 102a may provide or communicate the generated user-specific EPG information to corresponding devices.

Figure 5:
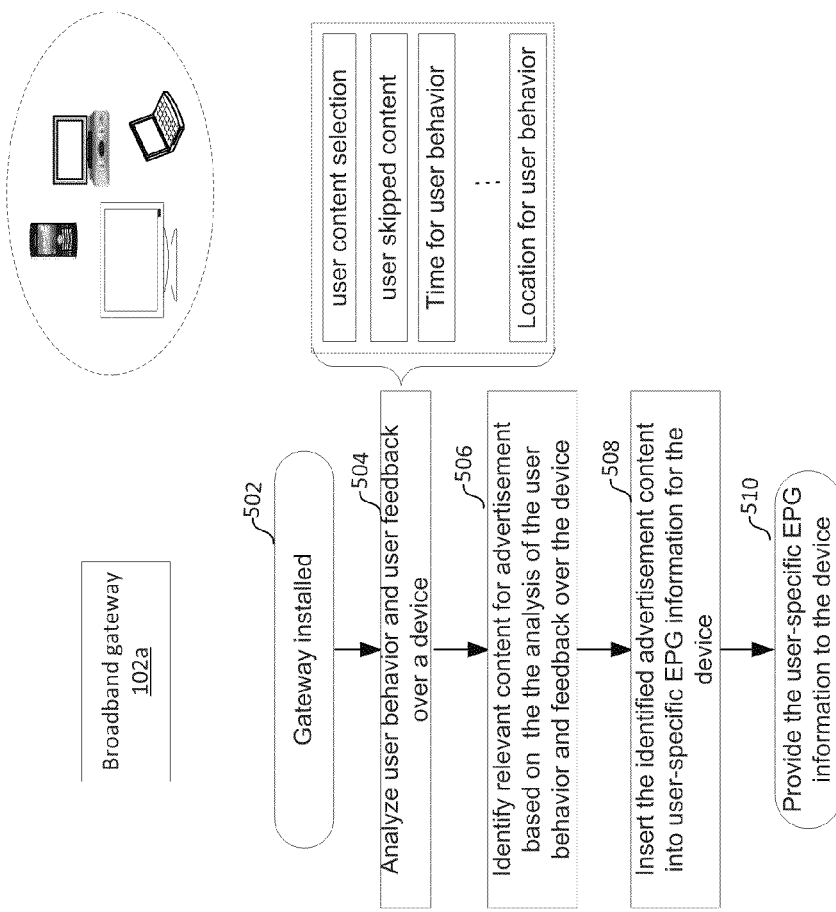
FIG. 5 is a flow chart illustrating exemplary steps that may be performed by a broadband gateway to support behavioral marketing in user-specific EPG information for customized content service in a home network, in accordance with an embodiment of the invention.

FIG. 5 is a flow chart illustrating exemplary steps that may be performed by a broadband gateway to support behavioral marketing in user-specific EPG information for customized content service in a home network, in accordance with an embodiment of the invention. Referring to FIG. 5, the exemplary steps may begin with step 502, in which a broadband gateway 102a may interface with multiple service providers $302_1$-$302_N$, and devices coupled to the broadband gateway 102a. In step 504, the broadband gateway 102a may monitor and analyze user behavior and user feedback on a device 104. In step 506, the broadband gateway 102a may identify or select advertising content based on the analysis of the user behavior and user feedback on the device 104. In step 508, the broadband gateway 102a may insert or embed the selected advertising content into user-specific EPG information for the device 104. In step 510, the broadband gateway 102a may provide or communicate the user-specific EPG information to the device 104 to support behavioral marketing in the home network 100a.

Various aspects of a method and system for utilizing an electronic program guide (EPG) for customized content service in a gateway are provided. In various exemplary embodiments of the invention, a broadband gateway 102a, which enables communication with a plurality of devices 104, is operable to handle at least one physical layer connection to at least one corresponding network access service provider. The at least one physical layer connection may comprise a plurality of physical layer connections such as the physical layer connections $210_1$-$210_J$ and the at least one corresponding network access service provider may comprise a plurality of corresponding access service providers such as the service providers 120 and/or the content providers 130. Each of the plurality of physical layer connections $210_1$-$210_J$ corresponds to a respective one of the plurality of corresponding access service providers. The broadband gateway 102a may be operable to communicate or interact with multiple service providers such as the service providers 120 and/or the content providers 130 to identify EPG information. The EPG information identified from multiple service providers may be adapted to device attributes and/or user profiles for the corresponding devices 104 to generate user-specific EPG information.

The broadband gateway 102a may communicate the generated user-specific EPG information to the corresponding devices 104. Depending on device type, device attributes may comprise a display resolution, decoding algorithms supported, power consumption levels, quality of service (QoS), number of program channels supported, and/or bandwidth. User profiles may comprise user criteria, user preferences, user behavior, and/or user feedbacks. The generated user-specific EPG information may be dynamically configured in response to updates in the identified EPG information, the device attributes and/or the user profiles.

The broadband gateway 102a may communicate the configured user-specific EPG information to the corresponding devices 104, either upon the requests from the devices 104 or by initiation of the broadband gateway 102a. The devices 104 may display the corresponding user-specific EPG information for content selection and/or content scheduling. The broadband gateway 102a may analyze the user behavior and/or user feedbacks on the devices 104. Advertising content may be selected or identified by the broadband gateway 102a based on the analysis of the user behavior and the user feedbacks on the devices 104. The broadband gateway 102a may support behavior marketing by communicating the selected advertising content in the generated user-specific EPG information to the corresponding devices 104.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for utilizing an electronic program guide (EPG) for customized content service in a gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a broadband gateway that enables communication with a plurality of devices, wherein said broadband gateway is configured to handle a plurality of physical layer connections to a plurality of corresponding network access service providers:
   obtaining information for a plurality of electronic program guides provided by said corresponding network access service providers, the information being based at least in part on data for at least one of a programming quality, a bandwidth, a resolution, or a power consumption;
   accessing power consumption related information of one or more of said plurality of devices stored in said broadband gateway, said power consumption related information comprising content adaptation options;
   generating, using a combination of at least a portion of the information for the electronic program guides and said power consumption related information, an adapted electronic program guide that corresponds to a power consumption level for at least one of said devices that is reduced relative to that for an electronic program before adaptation; and
   communicating said adapted electronic program guide to said at least one of said devices.

2. The method of claim 1, wherein each one of said physical layer connections corresponds to a respective one of said corresponding access service providers.

3. The method of claim 1, wherein said adapted electronic program guide is further generated according to a device attribute comprising at least one of a display resolution, a supported decoding algorithm, a power consumption level, a quality of service (QoS), a number of a plurality of program channels supported, a bandwidth, or any combination thereof.

4. The method according to claim 3, comprising generating an updated version of said adapted electronic program guide in response to an update for at least one of said electronic program guides, an update for said power consumption level, or any combination thereof.

5. The method according to claim 4, comprising communicating said updated version of said adapted electronic program guide to at least one of said devices.

6. The method according to claim 5, wherein communicating said updated version of said adapted electronic program guide is initiated by said broadband gateway or in response to a request from at least one of said devices.

7. The method according to claim 1, further comprising accessing energy related information of one or more links in a local network and generating said adapted electronic program guide based at least in part on said energy related information of said one or more links.

8. The method according to claim 1, wherein said adapted electronic programming guide is configured to be displayed in at least one of said devices to facilitate a content selection, a content scheduling, or any combination thereof.

9. The method according to claim 1, comprising:
analyzing a user behavior, a user feedback, or any combination thereof; and
selecting an advertising content to include in conjunction with said adapted electronic program guide based on said analyzing.

10. The method according to claim 9, comprising communicating said advertising content in said adapted electronic program guide to at least one of said devices.

11. A system for networking, the system comprising:
one or more circuits for use in a broadband gateway that enables communication with a plurality of devices, wherein said broadband gateway is configured to handle a plurality of physical layer connections to a plurality of corresponding network access service providers, said one or more circuits being configured to:
obtain information for a plurality of electronic program guides provided by said corresponding network access service providers;
access power consumption related information of one or more of said plurality of devices stored in said broadband gateway, said power consumption related information comprising content adaptation options;
generate, using the information for at least one of the electronic program guides and said power consumption related information, an adapted electronic program guide that corresponds to a power consumption level for at least one of said devices that is reduced relative to that of an electronic program before adaptation; and
communicate said adapted electronic program guide to said at least one of said devices.

12. The system according to claim 11, wherein each of said physical layer connections corresponds to a respective one of said corresponding access service providers.

13. The system according to claim 11, wherein:
said one or more circuits are further configured to generate the adapted electronic program guide according to a device attribute comprising at least one of a display resolution, a supported decoding algorithm, a power consumption level, a quality of service (QoS), a number of a plurality of program channels supported, a bandwidth, or any combination thereof.

14. The system according to claim 13, wherein said one or more circuits are configured to generate an updated version of said adapted electronic program guide in response to an update for at least one of said electronic program guides, an update for said power consumption level, an update for said user profile, or any combination thereof.

15. The system according to claim 14, wherein said one or more circuits are configured to communicate said updated version of said adapted electronic program guide to at least one of said devices.

16. The system according to claim 15, wherein said one or more circuits are configured to communicate said updated version of said adapted electronic program guide initiated by said broadband gateway or in response to a request from at least one of said devices.

17. The system according to claim 11, wherein said one or more circuits are configured to access energy related information of one or more links in a local network and generating said adapted electronic program guide based at least in part on said energy related information of said one or more links.

18. The system according to claim 15, wherein said adapted electronic programming guide is configured to be displayed in at least one of said devices to facilitate a content selection, a content scheduling, or any combination thereof.

19. The system according to claim 12, wherein said one or more circuits are configured to:
perform an analysis on a user behavior, a user feedback, or any combination thereof; and
select an advertising content to be included with said adapted electronic programming guide based on said analysis.

20. The system according to claim 19, wherein said one or more circuits are configured to communicate said advertising content in said adapted electronic program guide to at least one of said devices.

21. The system of claim 11, wherein the information for the electronic program guides comprises data for at least one of a programming quality, a bandwidth, a resolution, or a power consumption.

22. A method, comprising:
obtaining, in a broadband gateway device, information for a plurality of electronic program guides from a plurality of network access service providers;
accessing power consumption related information of one or more of said plurality of devices stored in said broadband gateway, said power consumption related information comprising content adaptation options;
generating, in the broadband gateway device, an adapted electronic program guide that corresponds to a power consumption level for a device that is reduced relative to that for an electronic program before adaptation, using a combination of the information for the electronic program guides and said power consumption related information, said device in communication with the broadband gateway device; and
providing the adapted electronic program guide to said device.

* * * * *